Figure 1:
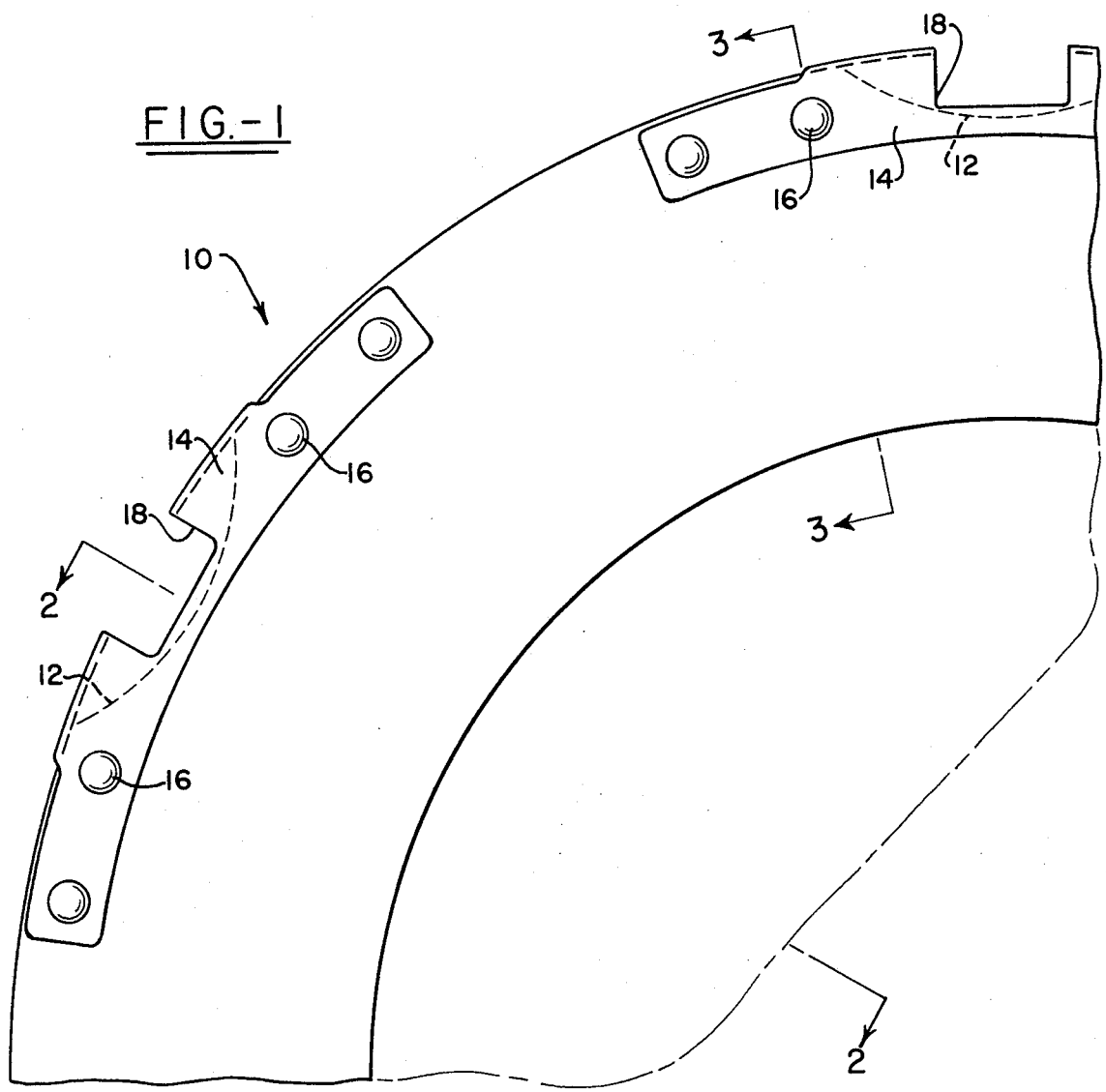

United States Patent
Cook et al.

[11] 3,712,427
[45] Jan. 23, 1973

[54] GRAPHITE AND/OR CARBON DISK WITH REMOVABLE WEAR FACES

[75] Inventors: Albert W. Cook, Tallmadge; Joseph F. Dernovshek, Akron, both of Ohio

[73] Assignee: The Goodyear Tire & Rubber Company, Akron, Ohio

[22] Filed: Nov. 5, 1970

[21] Appl. No.: 87,126

[52] U.S. Cl. ...... 188/251 A, 188/218 XL, 192/107 M
[51] Int. Cl. .............................................. F16d 69/02
[58] Field of Search..188/73.2, 218 XL, 264 CC, 251 R, 188/251 A; 192/107 R, 107 M

[56] References Cited

UNITED STATES PATENTS

| | | | |
|---|---|---|---|
| 2,542,545 | 2/1951 | Lyman | 188/218 XL |
| 3,237,731 | 3/1966 | DuBois | 188/218 XL |
| 3,478,850 | 11/1969 | Akeel | 188/264 CC X |
| 3,530,960 | 9/1970 | Otto et al. | 188/218 XL |
| 3,548,979 | 12/1970 | Nelson et al. | 188/264 CC |
| 3,552,533 | 1/1971 | Nitz | 188/251 A X |

FOREIGN PATENTS OR APPLICATIONS 1,140,969  3/1957  France ..................... 188/218 XL Primary Examiner—George E. A. Halvosa
Attorney—F. W. Brunner, P. E. Milliken and Oldham & Oldham

[57] ABSTRACT

The invention comprises a brake disk assembly in the form of a carbon or graphite disk which is provided on both sides with thin wear plates of carbon or graphite material. The plates are either in segmented or full circle form and are secured to the core by rivets and bushings which also secure the keyway drives of the disks.

9 Claims, 12 Drawing Figures

PATENTED JAN 23 1973 3,712,427

SHEET 1 OF 2

INVENTORS
ALBERT W. COOK
JOSEPH F. DERNOVSHEK

BY: *Oldham & Oldham*
ATTORNEYS 3,712,427

GRAPHITE AND/OR CARBON DISK WITH REMOVABLE WEAR FACES

This invention relates to brake assemblies of the type having alternate rotating and stationary brake disks carried between and axially movable between a backing plate and a pressure plate. More particularly, the invention relates to an improved brake disk for use in such an assembly.

With carbon or graphite brake disks of the prior art the entire assembly must be discarded when the surfaces of the disk have become sufficiently worn. This, however, involves the discarding of a disk which is still structurally sound, and the replacement with a new assembly is extremely expensive.

It is the primary object of the invention to provide a graphite or carbon brake disk in which the wear surfaces of the disk may be renewed or refurbished without requiring the discarding of the entire assembly, thus realizing a considerable cost saving in replacement over the prior art disk assemblies.

In the present invention this object is achieved by providing on a carbon or graphite disk core renewable wear surface disks which may be of the same material as the core which are mechanically secured to the core and which may be provided for a worn disk, replaced themselves, as necessary, and all without requiring the discarding of the entire base disk assembly. The wear surfaces are secured by the bushings and rivets which hold the keyway drives to the disks.

A further object of the invention is to provide a method to effect refurbishment so that disks can have great longevity, and replacement can be made at minimum cost.

For a more complete understanding of the invention and of the objects and advantages thereof, reference should be had to the following specification and the accompanying drawings wherein there is shown a preferred embodiment of the invention.

Figure 2:
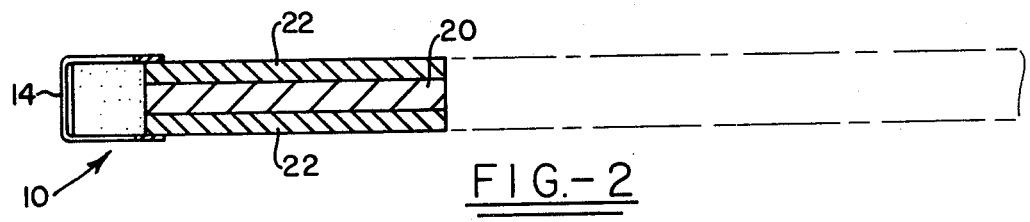
Figure 3:
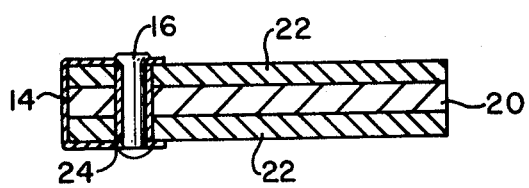
Figure 4A:
Figure 4B:
Figure 4C:
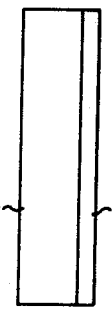
Figure 5A:
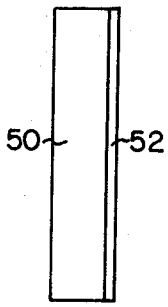
Figure 5B:
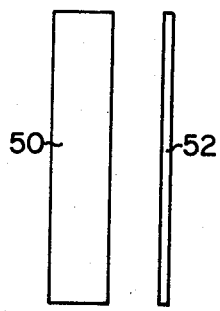
Figure 5C:
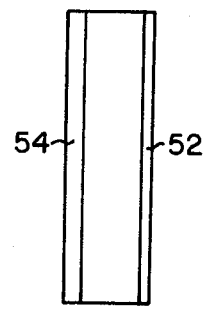

In the drawing:

FIG. 1 is a fragmentary side elevational view of a brake disk constructed in accordance with the present invention, the disc shown being a rotating disk;

FIGS. 2 and 3 are fragmentary sectional views taken along the lines 2—2 and 3—3, respectively, of FIG. 1 and showing the arrangement by which the wear plates are attached to the disk core; and FIGS. 4A, B, C, 5A, B, C and 6A, B, C, represent the method of refurbishment of a new solid disk for the first, second, and third refurbishment, respectively.

The reference numeral 10 designates generally a brake disk which is in the form of an annular ring and which is provided at uniformly spaced intervals on its outer circumference with slots 12. Keyway drives 14 are secured to the annular disk at each of the slots 12 and held in place by rivets 16. Each of the keyway drives 14 includes a notch 18 for receiving the splines or keys of a rotating wheel assembly so that the disks are rotated with the wheel while being capable of axial movement relative to the wheel.

As is shown in FIGS. 2 and 3, the disk 10 is formed of a core disk 20 which is of a graphite or carbon base material and of wear plates 22 on each face of the core 20. The wear plates 22 may be of the same graphite or carbon base material as the core plate 20 and may be either in the form of annular rings of the same size as the core 20 or in the form of segmented rings each forming a part of the annular ring. The wear plates 22 may, however, be of a graphite or carbon base designed to provide greater frictional and heat sink capabilities, but not as great a structural capability as the core plate 20. Preferably, the core plate 20 will have good resistance to oxidation and great structural strength. The core plate 20 should be a minimum of 1½ times the thickness of each respective wear plate 22. The wear plates 22 may be full circle or segmented as long as the segments are secured at both ends by rivets or other appropriate means. In either event, the wear plates 22 are mechanically secured to the core 20 by means of the rivets 16 which secure the keyway drives 14 in place. The rivets 16 are not positioned within the rubbed face of the plates 22 and hence the plates 22 may be quite thin. Bushings 24 are provided on the rivets 16 to uniformly distribute the forces between the wear plates 22 and the core plate 20. The wear plates 22 may, for example, be of from 0.075 to 0.175 inches thick. The overall thickness of the disk assembly may typically be between 0.400 and 0.600 inches.

When the wear plates 22 become sufficiently worn that they must be replaced, it is merely necessary to remove the rivets 16, the bushings 24 and the keyway drives 14. The worn wear plates 22 are now discarded and new wear plates placed on either side of the core 20. The keyway drives 14 are again riveted in place with the bushings 24 and the rivets 16 thus securing the new wear plates 22 to the core 20. The brake disk 10 is thus renewed and capable of being reused. Since the wear plates 22 are relatively thin only a small amount of carbon or graphite material is actually discarded, the core 20 which forms the bulk disk being reused.

It should be understood that while the disk illustrated and described above is a rotating disk having the keyway drives 14 and keyway slots 18 on its outer circumference, the principles of the invention may be as advantageously employed in a stationary brake disk, or one in which the keyway drives and keyway slots are provided along the inner circumference of the disk.

The method of the invention includes a way to refurbish carbon disks including the pressure and end plates. The low coefficient of thermal expansion and other desirable properties such as the high heat transfer coefficient make a carbon base material ideal from this standpoint. By refurbish, it is meant to take an initial solid carbon disk, and refurbish it according to the techniques defined hereinafter. The technical feasibility of refurbishing has been proved by laboratory dynamic brake testing. Specifically, after the disks went through a specified brake life, they were refurbished and run through a required dynamic brake test the second time to determine if the same characteristics were present.

FIGS. 4A, B, C, 5A, B, C, and 6A, B, C represent the refurbishment cycle which is believed to represent the optimum procedure. The first refurbishment is illustrated which shows in view 4A a brake disk indicated by numeral 50 which has been worn about 0.060 so that for a rotating disk it would have a thickness of about 0.480 inches and for a stationary disk about 0.520 inches. The refurbishment technique in its first step will constitute grinding both faces of the disk 50 enough to smooth it and provide parallel opposite surfaces, or about 0.030 so that for a rotating disk the thickness would be approximately 0.450 inches and for a stationary disk the thickness would be about 0.490 inches. The initial thickness is then achieved by refurbishing with a carbon plate or disk 52 as indicated in view 4C that is approximately 0.150 inches in thickness to thereby increase the overall disk thickness by that amount, hence bringing the total disk thickness up to the desired pre-worn condition. The plate 52 is attached in the manner as illustrated in FIGS. 1 through 3, but is attached only on one side as indicated in view 4C.

When the disk 50 and plate 52 have again worn as indicated in view 5A to approximately the same thickness dimensions as in view 4A both the disk 50 and plate 52 are ground to the dimensions indicated in view 5B, with a new plate 54 being added as in view 5C to complete the refurbishing of the disk and the return to its initial thickness dimensions. Note, however, that plate 52 is only approximately one-half the thickness of plate 54. This completes the second refurbishing with a structure which now has two wear plates 52 and 54 of different thickness configurations.

Figure 6A:
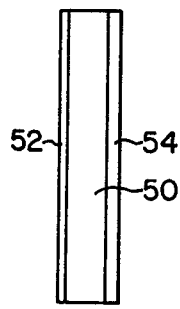
Figure 6B:
Figure 6C:
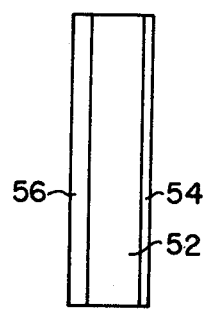

The third refurbishment and all subsequent refurbishments are illustrated in FIGS. 6A, B, C where view 6A illustrates the worn disk 50 and plates 52 and 54. View 6B illustrates the grinding of plate 54 while view 6C illustrates the positioning of a new plate 56 in combination with plate 54 to achieve the complete refurbishing. In this instance, plate 52 has been discarded because it has worn to such a thin thickness that it is no longer structurally usable. Note, however, that the base disk 50 remains at the same thickness during the third refurbishment and, of course, for all refurbishments thereafter.

While in accordance with the Patent Statutes, only the best known embodiment of the invention has been described and illustrated in detail it will be understood that the invention is not so limited. Reference should therefore be had to the appended claims in determining the true scope of the invention.

What is claimed is:

1. A brake disk assembly, comprising:
   an annular core plate of a carbon based material having substantially flat opposite sides;
   at least one thin wear plate of a carbon based friction material substantially fully covering at least one of the opposite sides of the core plate;
   means to mechanically secure the thin plate to the core comprising bushings extending through the thin plate and the annular core and rivets extending through the bushings, a plurality of integral keyway drives on one circumference of the disk, and means to mechanically secure the drives to the thin plate and annular core as a unit.

2. The brake disk assembly according to claim 1 wherein plates are secured to both sides of the core and each thin plate is in the form of an annular ring of the same configuration as the annular core, and each thin plate is of substantially the same material as the core.

3. The brake disk assembly according to claim 1 wherein plates are secured to both sides of the core and the thin plates are in the form of segments of an annular ring, the thin plates on each side of the core forming an annular ring of the same configuration as the annular core.

4. The brake disk assembly according to claim 1 wherein each thin plate is from 0.075 to 0.250 inches thick.

5. A brake disk assembly according to claim 1 where the core has the properties of being resistant to oxidation and having great structural strength, and the thin plate of friction material has the properties of being an excellent heat sink and having good frictional characteristics.

6. A brake disc according to claim 1 where the core is segmented and the thin plate of friction material is segmented, and the means to mechanically secure the thin plate to the core maintain the segments in an annular disc configuration.

7. A brake disk according to claim 1 where the core plate is at least one and ¼ times the thickness of the thin plate of friction material.

8. The brake disk according to claim 1 wherein each keyway drive has a pair of side portions extending along opposite sides of the brake disk adjacent 1 circumference thereof, the rivets extending through the non-rubbed side portions.

9. The brake disk according to claim 1 wherein bushings extend through the thin plates and the annular core to receive the rivets.

* * * * *